Aug. 2, 1960  L. P. BRANNAN  2,947,441
LAMINATED DISPOSABLE ASH TRAY
Filed June 22, 1956
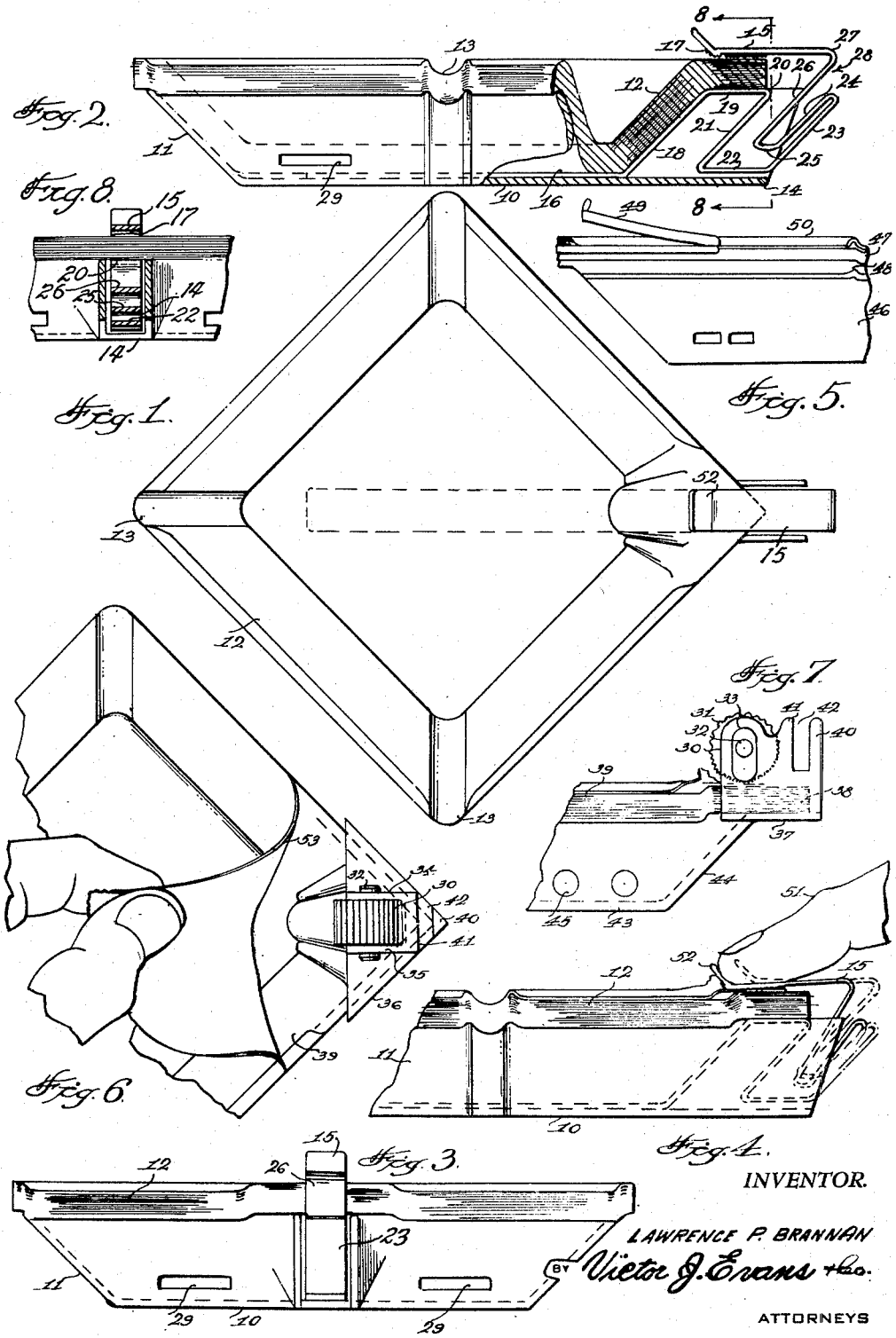
INVENTOR.
LAWRENCE P. BRANNAN
BY Victor J. Evans + Co.
ATTORNEYS

United States Patent Office 2,947,441
Patented Aug. 2, 1960

2,947,441

LAMINATED DISPOSABLE ASH TRAY

Lawrence P. Brannan, 5431 North Indiana,
Kansas City 16, Mo.

Filed June 22, 1956, Ser. No. 593,284

2 Claims. (Cl. 220—63)

This invention relates to ash trays for cigarettes, cigars, and the like, and in particular a laminated ash tray including a plurality of relatively thin sheets of material wherein after use the upper layer or sheet of material is peeled off and, with ashes, cigarettes and cigar butts therein discarded whereby the ash tray is provided with a clean fresh surface.

The purpose of this invention is to eliminate the odor of conventional ash trays and to provide means for readily cleaning an ash tray without washing or the like.

Conventional ash trays, and particularly ash trays containing cigarette butts, match stems, ashes and the like are difficult to clean, particularly as portions thereof are burned with smoldering cigarette butts before the butts are completely extinguished. With this thought in mind this invention contemplates an ash tray including a plurality of layers of fire resistant material wherein, to clean the tray, it is only necessary to remove the upper layer or sheet of material.

The object of this invention is, to provide means for forming an ash tray whereby the tray is substantially odorless and wherein the tray is adapted to be provided with a fresh clean surface as desired.

Another object of the invention is to provide a laminated ash tray in which the lining thereof is readily removable and in which means is provided for freeing the upper layer of the lining from the body of the ash tray.

A further object of the invention is to provide an ash tray formed with laminated layers of fire resistant material wherein the layers are adapted to be independently removed in which the ash tray is of a simple and economical construction.

With these and other objects and advantages in view the invention embodies a tray having a base with upwardly inclined sides, with laminated layers of fire resistant material positioned on the inner surface and with means for separating an upper layer from the laminated layers.

Other features and advantages of the invention will appear from the following description taken in connection with the drawing, wherein:

Figure 1 is a plan view of the improved ash tray.

Figure 2 is a side elevational view of the ash tray with parts broken away showing the laminated layers of material in the tray and also showing a spring clip with a rough lower surface for separating an edge or corner of an upper layer of material from the laminated layers.

Figure 3 is a side elevational view of the improved ash tray looking toward one corner thereof.

Figure 4 is an elevational view similar to that shown in Fig. 1 with part of the ash tray removed and showing the spring clip actuated by a finger of the hand of an operator for loosening an upper layer of the laminated layers.

Figure 5 is an elevational view showing one side of the ash tray illustrating a modification wherein binding or adhesive tape is used around edges of the laminated layers, the tape being shown with one end partially removed.

Figure 6 is a plan view showing a portion of the ash tray with the parts illustrated in Fig. 7 wherein the upper layer is gripped by the thumb and forefinger of the hand after being loosened by a knurled wheel as shown in Fig. 7.

Figure 7 is a side elevational view, similar to that shown in Fig. 2 illustrating another modification wherein a wheel with a knurled surface is provided for separating corners or edges of the laminated layers from the remaining layers, part of the tray being broken away.

Fig. 8 is a vertical sectional view of one corner of the tray taken on the line 8—8 of Fig. 2.

Referring now to the drawing wherein like reference characters denote corresponding parts the improved laminated ash tray of this invention includes a tray of cardboard, plastic or the like having a base 10 with upwardly inclined side walls 11 and with laminated layers 12 of a suitable fire resistant material, such as aluminum foil nested in the tray.

The upper edges of the tray may be provided with arcuate cigarette receiving recesses 13 and one corner may be provided with a slot having an extended lip 14, upon which a spring clip having an upper thumb receiving section 15 and a tongue 16 is positioned, and with the section 15 of the clip provided with a rough under surface 17 as shown in Figs. 2 and 4 of the drawing, the end 15 is adapted to be pressed downwardly and moved toward the center of the tray, as illustrated in Fig. 4 to separate the edge of the upper layer from the laminated sheets of material whereby by gripping the separated edge between the thumb and forefinger the upper layer may be peeled from the remaining layers in the tray, as illustrated in Fig. 6.

The spring clip is provided with an upwardly inclined section 18 extended from the tongue 16 and positioned to correspond with the angle of the side walls of the tray and from the upper end a horizontally disposed section 19 extends to the point 20 corresponding with the outer edges of the laminated layers. From the point 20 the strip slopes downwardly and inwardly forming a section 21 and the lower end of the section 21 is connected to a horizontally disposed lower section 22 that is spaced above the lip or extension 14. From the outer end of the section 22 the clip slopes upwardly forming a section 23 providing a U bend 24 that extends downwardly parallel to the sections 18, 21 and 23, to a point 25 and from the point 25 the clip extends upwardly forming a section 26, the upper end of which merges with the section 15, at the point 27. By this means the outer end of the clip provides an open socket 28, in the U bend 24 in which book matches and the like may be placed.

The lower portions of the inclined wall 11 of the ash tray are provided with openings 29 to discourage using the cardboard supporting tray as an ash tray after the last liner is used.

In the design illustrated in Figs. 6 and 7 the ash tray is provided with a roller 30 having a knurled surface 31 and the shaft 32 extended through the roller is positioned with ends thereof extended into slots 33 in side walls 34 and 35 of a bracket 36 that is positioned over a corner of the ash tray with a base 37 of the bracket extended below the extended tabs 38 of the laminated sheets 39. The bracket is provided with a corner finger 40 and a section 41 connecting the walls 34 and 35 whereby a socket 42 for retaining a match book on the ash tray, is provided. In this design the ash tray is provided with a base 43 upwardly inclined walls 44, and the walls 44 are provided with openings 45, similar to the openings 29 of the wall of the ash tray shown in Figs. 1 and 2.

In the design shown in Fig. 5 an ash tray 46 having laminated layers of material 47 on the inner surface and extended over a flange 48 on the upper edge, is provided with a strip of binding or adhesive tape 49 that secures a cover 50 in position over the laminated layers and that retains the edges of the layers in assembled relation until used. The strip of tape may be removed, as shown in Fig. 5 when the ash tray is distributed for use.

With the parts assembled as illustrated and described and, particularly as shown in Fig. 4 a thumb or forefinger of a hand of an operator, as indicated by the numeral 51 is positioned upon the upper section or extension 15 of the spring clip with the end of the finger against a lip 52 and with the strip of rough material 17 urged downwardly against the uppermost laminations the edge of the layer is moved inwardly, separating the edge of the layer from the layers below. With the corner or edge of the upper layer separated from the layer below the edge is gripped by the thumb and forefinger of a hand of the operator, as illustrated in Fig. 6, whereby the layer of material, as indicated by the numeral 53 is peeled from the layers below and ashes, cigarette and cigar butts, used match books, and the like may be wrapped in the layer of material and deposited in a wastepaper basket or the like.

Upon removing the layer of material a fresh clean lining is presented for use and all odors of burning cigarettes, cigars, and the like are eliminated.

After the laminated layers are used from the ash tray the cardboard body or supporting tray is discarded.

It will be understood that other modifications, within the scope of the appended claims, may be made in the design and arrangement of the parts without departing from the spirit of the invention.

What is claimed is:

1. In an ash tray, the combination which comprises a tray having a base with upwardly inclined side walls, layers of laminated sheets providing a lining for the base and side walls, said base having an extension at one point, a deformable clip having a knurled surface mounted on the extension on said ash tray, supported by a tongue extended below the layers of laminated material and positioned whereby the clip may be moved so that the knurled surface thereof engages a portion of the uppermost of said laminated layers for loosening a portion of the layer from the layers below.

2. In an ash tray, the combination which comprises a tray having a base with upwardly inclined side walls, laminated layers of fire resistant material positioned in the tray and providing a lining for the base and side walls, said base having an extension at one point, and a deformable spring clip positioned on said extension, supported by a tongue extended below the layers of laminated material, and having a section with a rough under surface extended over the uppermost of said layers of material and formed to free a portion of the uppermost layer of material from the layer of material below.

References Cited in the file of this patent

UNITED STATES PATENTS

| | | |
|---|---|---|
| 322,670 | Yates | July 21, 1885 |
| 342,101 | Hoyt | May 18, 1886 |
| 730,082 | Bates | June 2, 1903 |
| 847,688 | Plummer | Mar. 19, 1907 |
| 1,212,185 | Cobb | Jan. 16, 1917 |
| 1,276,493 | Cooke | Aug. 20, 1918 |
| 1,912,860 | Ranhofer | June 6, 1933 |
| 2,158,770 | Bartlett | May 16, 1939 |
| 2,237,532 | Posnack | Apr. 8, 1941 |
| 2,324,440 | Tormohlen | July 13, 1943 |
| 2,542,413 | Ibsch | Feb. 20, 1951 |
| 2,705,962 | Webke | Apr. 12, 1955 |

FOREIGN PATENTS

| | | |
|---|---|---|
| 485,129 | France | Sept. 17, 1917 |